US009830072B2

(12) United States Patent
Liang et al.

(10) Patent No.: US 9,830,072 B2
(45) Date of Patent: Nov. 28, 2017

(54) METHOD, APPARATUS AND MOBILE TERMINAL FOR CONTROLLING AN APPLICATION INTERFACE BY MEANS OF A GESTURE

(71) Applicants: Jie Liang, Beijing (CN); Weizhong Jiang, Beijing (CN)

(72) Inventors: Jie Liang, Beijing (CN); Weizhong Jiang, Beijing (CN)

(73) Assignee: UC MOBILE LIMITED, Beijing (CN)

( * ) Notice: Subject to any disclaimer, the term of this patent is extended or adjusted under 35 U.S.C. 154(b) by 428 days.

(21) Appl. No.: 14/379,512

(22) PCT Filed: Apr. 7, 2013

(86) PCT No.: PCT/CN2013/073799
§ 371 (c)(1),
(2) Date: Aug. 19, 2014

(87) PCT Pub. No.: WO2014/005445
PCT Pub. Date: Jan. 9, 2014

(65) Prior Publication Data
US 2015/0020035 A1 Jan. 15, 2015

(30) Foreign Application Priority Data
Apr. 6, 2012 (CN) .......................... 2012 1 0099842

(51) Int. Cl.
*G06F 3/0488* (2013.01)
*G06F 3/0482* (2013.01)
*G06F 3/0483* (2013.01)

(52) U.S. Cl.
CPC ........ *G06F 3/04883* (2013.01); *G06F 3/0482* (2013.01); *G06F 3/0483* (2013.01)

(58) Field of Classification Search
CPC ............. G06F 3/04883; G06F 3/04882; G06F 3/0482; G06F 3/0483
(Continued)

(56) References Cited

U.S. PATENT DOCUMENTS

2010/0238131 A1* 9/2010 Aoyagi ............... G06F 3/04842
345/173
2010/0306710 A1* 12/2010 Poot .................... G06F 3/04812
715/856

(Continued)

FOREIGN PATENT DOCUMENTS

CN 101697107 A 4/2010
CN 101893984 A 11/2010
(Continued)

OTHER PUBLICATIONS

The World Intellectual Property Organization (WIPO) International Search Report for PCT/CN2013/073799 Jul. 18, 2013 7 Pages.

*Primary Examiner* — Angie Badawi
(74) *Attorney, Agent, or Firm* — Anova Law Group, PLLC (57) ABSTRACT

Various embodiments provide a method, apparatus and mobile terminal for controlling an application interface by means of a gesture. In an exemplary method, a terminal browser can obtain a preset gesture that is inputted into a screen for generating a control point. The control point can be generated according to the preset gesture inputted into the screen. The control point can be associated with one or more preset areas on the screen. The terminal browser can obtain an operation gesture inputted into the screen targeted for the control point and, according to the operation gesture, generate an application interface corresponding to a preset area that the control point is located at. The present disclosure can break through conventional interface operation modes, realizing application interface control via gestures without occu- (Continued)

pying visible screen space, and adding more freedom for the layout of the application interface on a mobile device.

15 Claims, 3 Drawing Sheets

(58) Field of Classification Search
USPC .......................................................... 715/863
See application file for complete search history.

(56) References Cited

U.S. PATENT DOCUMENTS

| | | | |
|---|---|---|---|
| 2011/0316797 A1* | 12/2011 | Johansson | G06F 3/04847 345/173 |
| 2012/0223890 A1* | 9/2012 | Borovsky | G06F 3/04883 345/173 |
| 2013/0100035 A1* | 4/2013 | Papakipos | G06F 1/169 345/173 |
| 2014/0310643 A1* | 10/2014 | Karmanenko | G06F 1/1626 715/784 |

FOREIGN PATENT DOCUMENTS

| | | |
|---|---|---|
| CN | 102037435 A | 4/2011 |
| CN | 102221978 A | 10/2011 |
| CN | 102243662 A | 11/2011 |
| CN | 102331910 A | 1/2012 |
| CN | 102681774 A | 9/2012 |
| WO | 2010077796 A1 | 7/2010 |
| WO | 2011025642 A1 | 3/2011 |

* cited by examiner

METHOD, APPARATUS AND MOBILE TERMINAL FOR CONTROLLING AN APPLICATION INTERFACE BY MEANS OF A GESTURE

CROSS-REFERENCES TO RELATED APPLICATIONS

This application is a national stage of PCT Patent Application PCT/CN2013/073799, filed on Apr. 7, 2013, which claims the priority of Chinese Patent Application No. 201210099842.8, filed on Apr. 6, 2012, the entire contents of all of which are incorporated herein by reference.

FIELD OF THE DISCLOSURE

The present disclosure relates to the field of communication technology and, more particularly, relates to methods, apparatus and mobile terminals for controlling an application interface by means of a gesture.

BACKGROUND

With society advancement and technology development, people use mobile terminals more and more to wirelessly access network for experience such as webpage browsing, media playback, user interaction, instant messaging, games, and the like. Such experience requires frequently closing or switching application interfaces and performing operations on the application interfaces such as and making selection, turning page, forward, backward options, and the like.

When using conventional methods for closing, newly creating, or switching windows (or application interfaces), a user usually clicks on a physical button or a virtual button (or control) to perform a corresponding control operation. For certain application software, especially reading-type software, during the usage of a mobile terminal, due to the limitations of the terminal itself, screen space is very valuable. The user does not desire to have any extra control to block the reading area. However, based on large-screen design requirements of mobile terminals, controls must occupy the limited screen space. A conflict is thus created. Users need large-area visual space, and also need convenient, personalized operation buttons.

A conventional user interface can only provide limited space for a user to customize freely. The user cannot decide the operation interface according to his/her own preferences. As mobile terminals increasingly become an important tool today for people's communication, information access, and entertainment, such a conflict has gradually affected human-computer interaction between the user and the mobile terminals.

BRIEF SUMMARY OF THE DISCLOSURE

In view of the above problems, the present disclosure provides a method, apparatus and mobile terminal for controlling an application interface by means of a gesture.

One aspect of the present disclosure includes a method for controlling an application interface by means of a gesture. The method includes the following process.

A terminal browser can obtain a preset gesture that is inputted into a screen for generating a control point.

The control point can be generated according to the preset gesture. The control point can be associated with one or more preset areas on the screen.

The terminal browser can obtain an operation gesture inputted into the screen targeted for the control point and, according to the operation gesture, generate an application interface corresponding to a preset area that the control point is located at.

Further, the control point can be an area control that is semi-transparent and floats above the application interface, and the control point is moved on the screen based on a dragging operation of a finger.

Further, each preset area of the one or more preset areas respectively corresponds to an application interface operation or a group of application interface operations.

Further, the generating of the application interface corresponding to the preset area that the control point is located at according to the operation gesture includes the following process. When the control point is located at or moved to the preset area, the control point can be transformed into an application interface operation control corresponding to the preset area.

Further, the preset area and the corresponding application interface operation can include one or more of the following:

the preset area provided at a top of the screen corresponding to a title-bar operation of the application interface;

the preset area provided at a bottom of the screen corresponding to a menu-bar operation of the application interface;

the preset area provided at a center position of the screen corresponding to an advanced-menu of the application interface; and the preset area provided at a center position of a left side or a right side of the screen corresponding to a page-turning operation of the application interface.

Further, the application interface operation corresponding to the each preset area can include an operation for restoring the application interface operation control as a free control point. The application interface operation control can be restored as the control point in response to a preset input of a user.

Further, the current control point can be deleted via another preset gesture or an opposite gesture of the preset gesture for generating the control point.

Further, a position where the control point is established is a position on the screen at which the preset gesture for generating the control point begins or ends. After being generated or moved, the control point can automatically snap to a nearest preset area.

Another aspect of the present disclosure includes an apparatus for controlling an application interface by means of a gesture, the apparatus can include an input-gesture-obtaining unit, a control-point-generating unit, and a control-point-operating unit.

The input-gesture-obtaining unit can be configured to obtain a preset gesture inputted into a screen for establishing a control point, and an operation gesture inputted into the screen targeted for the control point.

The control-point-generating unit can be configured to generate the control point according to the preset gesture, the control point being associated with one or more preset areas on the screen.

The control-point-operating unit can be configured to, according to the operation gesture, generate an application interface corresponding to a preset area that the control point is located at.

Further, the control-point-operating unit is configured to, when the control point is located at or moved to the preset area, transform the control point into an application interface operation control corresponding to the preset area.

Further, a position where the control-point-generating unit is configured to generate the control point can be a position on the screen at which the preset gesture for generating the control point begins or ends. The control-point-operating unit can be configured to, after the control point is generated or moved, cause the control point to automatically snap to a nearest preset area. The control-point-operating unit can be configured to delete the current control point via another preset gesture or an opposite gesture of the preset gesture for establishing the control point.

Another aspect of the present disclosure includes a touch-screen mobile terminal. The mobile terminal can include the apparatus for controlling an application interface by means of a gesture as described above.

The method, apparatus and mobile terminal for controlling an application interface by means of a gesture according to the present disclosure can break through conventional interface operation modes. The application interface can be controlled via gestures without occupying visible screen space. Thus, the layout of the application interface on the mobile device can have more freedom. Operation can be more flexible and intuitive. Accordingly, when a user uses the mobile terminal for webpage browsing, media playback, user interaction, instant messaging, and games, the user's experience can be improved.

To achieve the foregoing and related purposes, one or more aspects of the present disclosure include features that will be described later in detail and particularly pointed out in the claims. The following description and drawings illustrate certain exemplary aspects of the present disclosure in detail. However, these aspects merely indicate some modes of the various modes in which principles of the present disclosure may be used. Further, the present disclosure is intended to include all such aspects and equivalents thereof.

BRIEF DESCRIPTION OF THE DRAWINGS

The drawings, as a part of this application, are used for providing further understanding of the present disclosure. The exemplary embodiments of the present disclosure and description thereof are used for explaining the present disclosure and do not constitute undue limitation for the present disclosure. In the drawings.

In the drawings, the same reference number indicates similar or corresponding features or functions.

DETAILED DESCRIPTION

It is to be noted that, in the case of no conflict, various embodiments and features in the various embodiments in the present disclosure can be combined with each other. Reference will now be made in detail to exemplary embodiments of the disclosure, which are illustrated in the accompanying drawings.

In order to overcome visual inconvenience caused to a user by a conventional screen control blocking a reading area, in various embodiments of the present disclosure, combined operation control can be directly performed on an application interface on a mobile terminals by a screen-input gesture of the user, which can break through the conventional application interface operation mode and allows the layout of the mobile terminal interface to have more freedom. Based on the application control requirements of screen-input gesture, the mobile terminal applied to the methods according to various embodiments of the present disclosure a mobile terminal or any other device has a touch screen.

To achieve the purpose of controlling an application interface by combining gestures according to various embodiments, the concept of a control point can be introduced first. The control point can include an area control (or regional control) that is translucent (i.e., semi-transparent) and floats above the application interface. The control point can be established and deleted via a certain set screen-input gesture. The gesture can be freely defined. After being established, via being dragged by a finger, the control point can be docked at least one preset area that is set by the screen. Each preset area can correspond to an operation or a group of operations. The control point can be docked at different preset areas and can be transformed into a control panel designated for the preset area. Via the control panel, the corresponding operation or the corresponding set of operations can thus be performed.

Further, because the preset area is a control point docking area that is preset on the screen, in the description of various disclosed embodiments, the preset area is can also be referred to as a fixed docking area.

Therefore, in order to maximize the use of the visual space of a screen, one or more preset areas first need to be preset on a screen. Each preset area can correspond to an operation or a group of application interface operations. Then a control point can be defined. The control point can be defined as an area (or regional) control that is established to respond to a preset screen-input gesture inputted by a user. In addition, the control point can be moved based on a dragging operation of a finger. After the control point is defined, the above preset areas can be associated with the control point. When the control point is located at, or is moved to, a preset area, the control point can be transformed to an application interface operation control corresponding to the preset area. In response to a set (or preset) input of the user, the user application interface operation control can further be restored as a free control point.

Figure 1:
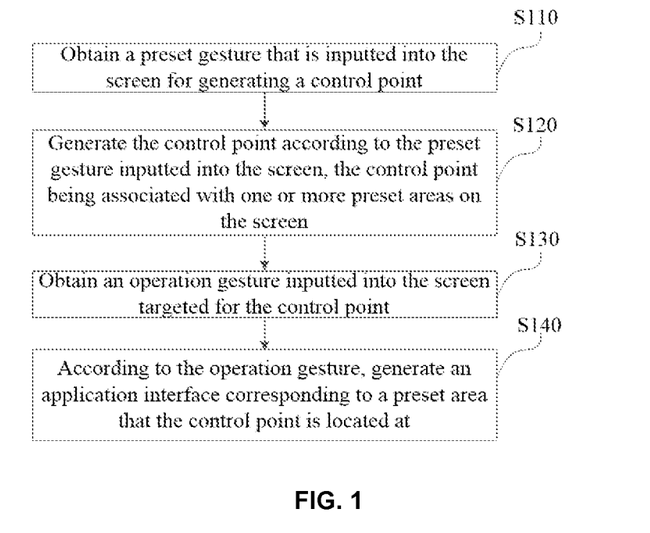
FIG. 1 depicts a flow diagram of an exemplary method for controlling an application interface by means of a gesture in accordance with various disclosed embodiments.

FIG. 1 depicts a flow diagram of an exemplary method for controlling an application interface by means of a gesture in accordance with various disclosed embodiments.

As shown in FIG. 1, when a user needs to perform an operation control on contents displayed on a terminal screen via gesture(s), the user first needs to input a preset gesture via a terminal screen. A terminal browser can obtain the preset gesture that is inputted into the screen for generating a control point (Step S110). Then, the control point can be generated according to the preset gesture inputted into the screen. The control point can be associated with one or more preset areas on the screen (Step S120). After the control point is generated, operation on the control point can be continued, and the terminal browser can obtain an operation gesture inputted into the screen targeted for the control point (Step S130), and then, according to the operation gesture, can generate an application interface corresponding to the preset area that the control point is located at (Step S140).

Thus, a control point can be established via a preset screen-input gesture. By establishing the control point and dragging the control point to the preset area, the control point can be transformed into a fixed operation panel of a current application interface.

Figure 2A:
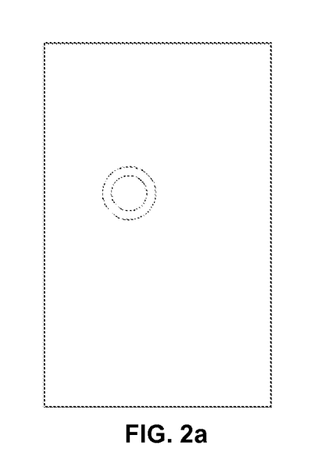
FIGS. 2a-2b depict a schematic of a free control point on a mobile terminal and a schematic of fixed docking areas of a free control point on a mobile terminal, respectively, in accordance with various disclosed embodiments.
Figure 2B:
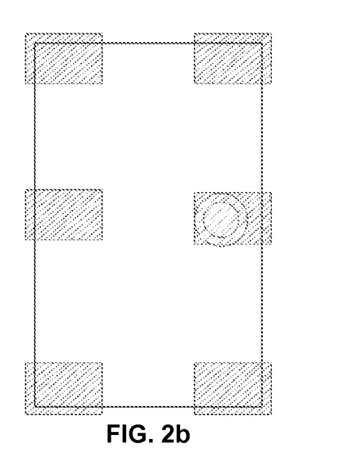

Specifically, as an example, FIGS. 2a-2b depict a schematic of a free control point on a mobile terminal and a schematic of fixed docking areas of a free control point on a mobile terminal, respectively, in accordance with various disclosed embodiments. In FIG. 2a, a control point can have a circular button shape. The control point can also be designed to have other shapes (e.g., hand shape, heart shape, or animal shape, etc.) according to the user's personal preference. Generally, the control point can be translucent, so as to ensure that the normal displayed contents on the screen at the location of the control point are not affected. The control point can float on the application interface, in order to be moved by the user conveniently.

In FIG. 2b, the striped areas can be preset areas. The control point can be dragged by a finger to be docked at a preset area that is set on the screen.

FIGS. 3a-3d respectively depict a schematic of a fixed docking area and a corresponding application interface operation in accordance with various disclosed embodiments. When a control point is moved to a preset area, the control point can be transformed into an application interface operation control corresponding to the preset area. Also, the application interface operation control can be configured to be restored as a control point in response to a preset input from the user.

Figure 3A:
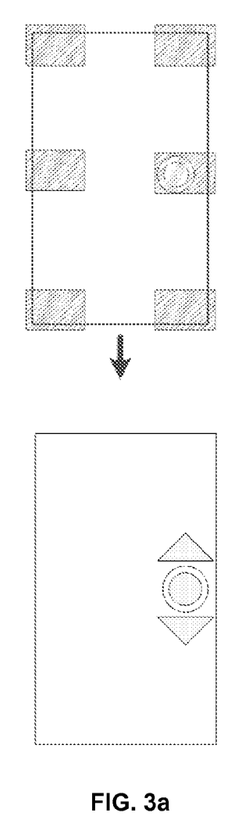
FIGS. 3a, 3b, 3c, and 3d respectively depict a schematic of a fixed docking area and a corresponding application interface operation in accordance with various disclosed embodiments.
Figure 3B:
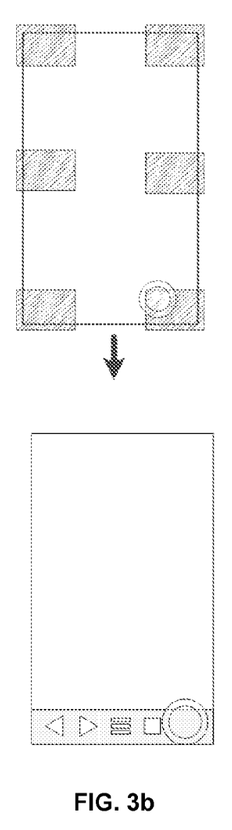
Figure 3C:
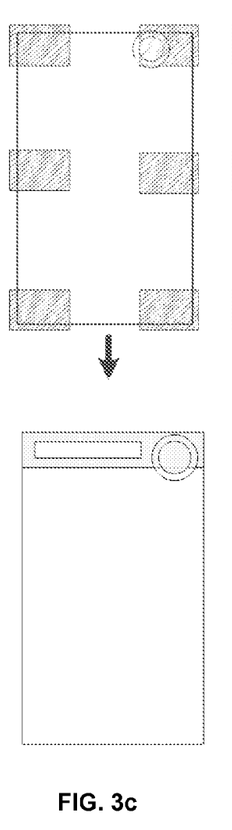
Figure 3D:
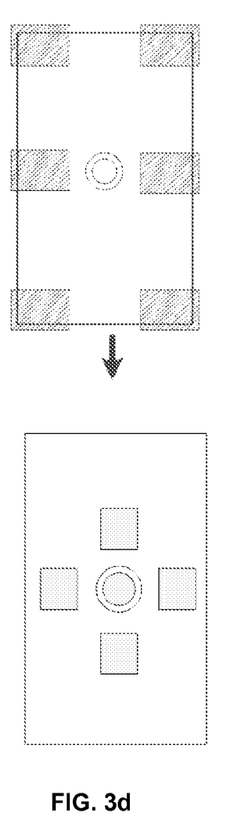

As shown in FIG. 3a, a fixed docking area provided at the center position of the right side (which may also be the left side) of the screen can correspond to a page-turning operation of the application interface. As shown in FIG. 3b, a fixed docking area provided at the bottom of the screen can correspond to a menu-bar operation of the application interface. As shown in FIG. 3c, a fixed docking area provided at the top of the screen can correspond to a title-bar operation of the application interface. As shown in FIG. 3d, a fixed docking area provided at the center position of the screen can correspond to an advanced-menu operation of the application interface. It should be noted that, the above are merely exemplary, without limitation. The preset areas and corresponding application interface operations can be configured according to needs.

Figure 4A:
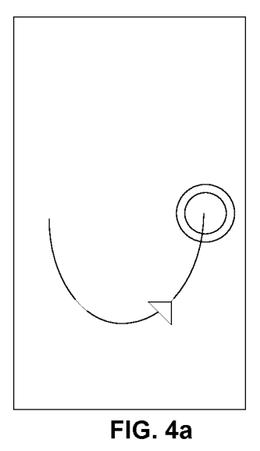
FIGS. 4a-4b depict a schematic of establishing a free control point and a schematic of deleting a free control point, respectively, in accordance with various disclosed embodiments.

In one embodiment of the present disclosure, a preset screen-input gesture for establishing a control point can include a "U" curve drawn from left to right on the screen by a finger, as shown in FIG. 4a. The position where the control point is established can be the end position of the "U" curve on the screen, i.e., the position where the preset screen-input gesture for establishing the control point ends.

Of course, other screen-input gestures for establishing the control point can also be defined, e.g., by drawing an S-shaped curve, drawing a triangle, etc. and can be set by the user according to needs. The position for establishing the control point can also be the position where the preset screen-input gesture for establishing the control point begins. On the same screen, a plurality of control points within a limit number can be allowed to exist, to ease the user's application interface operation.

Figure 4B:
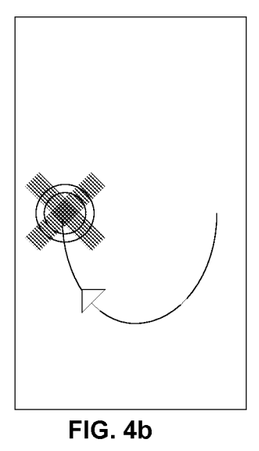

An operation for deleting a control point can be achieved via another preset screen-input gesture or an opposite gesture of the preset screen-input gesture for establishing the control point. FIG. 4b depicts a schematic of a gesture, where a control point is deleted via the gesture that is the opposite gesture of the gesture for establishing the control point as shown in FIG. 4a. As shown in FIG. 4b, by can tapping on and holding the control point, to reversely draw the "U" curve from right to left, the current control point can be deleted. When previously drawing the "U" curve from right to left indicates establishing, then in this case, drawing the "U" curve from left to right can indicate deleting.

A fixed operation panel and a control point can be transformed into each other. A preset input for restoring an application interface operation control into a control point can take various forms. For example, in the application interface operation(s) corresponding to each fixed docking area, an operation for restoring the application interface operation control to be a control point can be configured. Also, an application interface operation control can be restored as a control point by being double-clicked on or long pressed.

To improve the operation efficiency of the control point, when a fixed docking area is being associated with a control point, the control point can further be caused to automatically snap to the nearest fixed docking area after being established or moved.

As can be seen in the above examples, the method for controlling an application interface via a screen-input gesture in accordance with various disclosed embodiments can enable a user to break through conventional interface operation modes. The application interface can be controlled in an intuitive and convenient operation mode, without affecting the normal displaying of contents on the screen. Thus, the layout of the mobile device interface can have more freedom, and utilization of the screen for browsing can be maximized.

A method for controlling an application interface by means of a gesture in accordance with various disclosed embodiments is described as above. The above method for controlling an application interface by means of a gesture according to various disclosed embodiments can be implemented by using software, or by using hardware, or by using a method that combines software and hardware.

Figure 5:
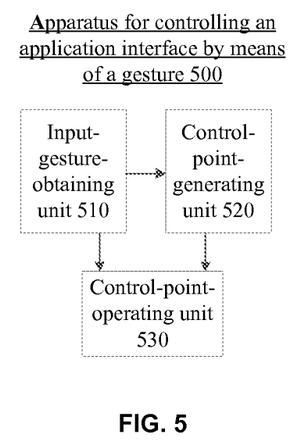
FIG. 5 depicts a block diagram of an exemplary apparatus for controlling an application interface by means of a gesture in accordance with various disclosed embodiments.

FIG. 5 depicts a block diagram of an exemplary apparatus 500 for controlling an application interface by means of a gesture in accordance with various disclosed embodiments. As shown in FIG. 5, the apparatus 500 for controlling an application interface by means of a gesture can include an input-gesture-obtaining unit 510, a control-point-generating unit 520, and a control-point-operating unit 530. The input-gesture-obtaining unit 510 is configured to obtain a preset gesture that is inputted into a screen for establishing a control point, and an operation gesture inputted into the screen targeted for the control point. The control-point-generating unit 520 is configured to generate the control point according to the preset gesture inputted into the screen. The control point can be associated with one or more preset areas on the screen. The control-point-operating unit 530 is configured to generate an application interface corresponding to the preset area that the control point is located at, according to an operation gesture targeted for the control point.

The apparatus 500 can include a processor. The processor 500 is configured to perform the functions of the above various modules.

In one embodiment of the present disclosure, the control-point-operating unit 530 is configured to, when the control point is located at or is moved to a preset area, transform the control point into an application interface operation control corresponding to the preset area.

In one embodiment of the present disclosure, a position at which the control-point-generating unit 520 generates the control point can include a position on the screen at which the preset gesture for establishing the control point begins or ends. After the control point is established or moved, the control-point-generating unit 520 can cause the control point to automatically snap to the nearest preset area. The control-point-operating unit 530 can delete the current control point via another preset gesture or an opposite gesture of the preset gesture for establishing the control point (as shown in FIG. 4).

It should be noted that the more specific modes of operation of the various units above can refer to the description of the disclosed methods, and are not repeated here.

In one further aspect, various embodiments of the present disclosure further provide a touch screen mobile terminal that includes the apparatus for controlling an application interface by means of a gesture. The method for controlling an application interface by means of a gesture according to various embodiments of the present disclosure can be implemented on the mobile terminal.

A program used for implementing the method for controlling an application interface by means of a gesture according to various embodiments can be stored on a computer storage medium. Thus, various embodiments further provide a computer storage medium. The computer storage medium can store the program used for implementing the method for controlling an application interface by means of a gesture according to various embodiments.

Further, typically, the mobile terminal as described in the present disclosure can include a variety of handheld terminal devices, e.g., mobile phone, personal digital assistant (PDA), and the like, so the scope of the present disclosure is not limited to a particular type of mobile terminal.

Furthermore, the method according to the present disclosure can also be implemented as a computer program executed by a central processing unit (CPU). When the computer program is executed the CPU, the functions defined above in the method of the present disclosure can be executed.

Further, the above method steps and system units can be implemented using a controller and a computer-readable storage device used for storing a computer program that can cause the controller to implement the functions of the above steps or units.

Further, it should be noted that the described computer-readable storage device (e.g., memory) may be volatile memory or non-volatile memory, or may include volatile memory and nonvolatile memory. As a non-limiting example, nonvolatile memory can include read-only memory (ROM), programmable ROM (PROM), electrically programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage device includes but are not limited to these and other suitable types of memory.

Those skilled in the art understand that the disclosed various exemplary logic blocks, modules, circuits and algorithm steps can be implemented in electronic hardware, computer software or a combination thereof. In order to clearly illustrate the interchangeability between the hardware and the software, the interchangeability has been generally described via the functions of the various exemplary components, blocks, modules, circuits and algorithm steps. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be implemented or executed by using the following components designed to execute the disclosed functionalities: general-purpose processor, digital signal processor (DSP), application specific integrated circuit (ASIC), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or in a combination of both. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

In one or more exemplary designs, the functions as described may be implemented in hardware, software, firmware, or any combination thereof. If implemented in software, the functions can be stored on a computer-readable medium or transmitted via a computer-readable medium as one or more instructions or code. The computer-readable medium can include computer storage medium and communication medium. The communication medium can include any medium that can help to transmit a computer program from one location to another location. The storage medium can include any usable medium that can be accessed by a general-purpose or special-purpose computer. As a non-limiting example, the computer-readable medium can include RAM, ROM, EEPROM, CD-ROM or other optical disk storage devices, magnetic disk storage devices or other magnetic storage devices, or can include any other medium that can be used for carrying or storing desired program code in the form of instructions or data structures and that can be accessed by a general-purpose or special-purpose computer or a general-purpose or special-purpose processor.

Also, any connection can be properly referred to as a computer-readable medium. For example, if a coaxial cable, optical fiber cable, twisted pair, digital subscriber line (DSL) or wireless technology such as infrared, radio and microwave is used for sending software from a website, a server, or other remote sources, the above coaxial cable, optical fiber cable, twisted pair, DSL or wireless technology such as infrared, radio and microwave can all be included in the definition of medium. As used herein, magnetic disk and optical disk can include compact disc (CD), laser disc, optical disc, digital versatile disc (DVD), floppy disk and blu-ray disc, where a magnetic disk usually magnetically reproduces data, while an optical disk reproduces data using laser optics. Combinations of the above contents should also be included within the scope of computer-readable media.

While the foregoing disclosure shows illustrative embodiments of the present disclosure, it should be noted that, without departing from the scope of the present disclosure as defined by the claims, various changes and modifications may be implemented. The functions, steps and/or actions of the method claims according to the various embodiments described herein are not required to be executed in any particular order. Furthermore, although an element of the present disclosure can be described or claimed in singular form, a plurality can be envisaged, unless explicitly restricted to be singular.

Methods and apparatus for controlling an application interface by means of a gesture according to various embodiments are described by way of examples with reference to drawings. However, the above are merely preferred embodiments of the present disclosure, and are not intended to limit the scope of the present disclosure. For a person skilled in the art, the present disclosure can have various modifications and changes. Any modification, equivalent replacement, improvement, etc., made within the spirit and principles of the present disclosure, should all be included within the scope of the present disclosure.

What is claimed is:

1. A method for controlling an application interface by means of a gesture, comprising:
   obtaining, by a terminal browser, a preset gesture that is inputted into a screen for generating a control point, wherein the control point is deleted via an opposite gesture of the preset gesture, the preset gesture includes a two-dimensional screen-input pattern that is drawn along one direction, and the opposite gesture of the preset gesture includes the two-dimensional screen-input pattern that is drawn along an opposite direction of the one direction;
   generating the control point according to the preset gesture, the control point being associated with a plurality of preset areas on the screen; and
   obtaining, by the terminal browser, an operation gesture inputted into the screen targeted for the control point and, according to the operation gesture, generating an application interface corresponding to a preset area that the control point is located at, by transforming the control point into an application interface operation control corresponding to the preset area when the control point is located at or moved to the preset area;
   wherein each preset area of the plurality of preset areas respectively corresponds to an application interface operation, the plurality of preset areas and the corresponding application interface operations include at least the following:
      a first preset area provided at a top of the screen corresponding to a title-bar operation of the application interface,
      a second preset area provided at a bottom of the screen corresponding to a menu-bar operation of the application interface,
      a third preset area provided at a center position of the screen corresponding to an advanced-menu of the application interface, and
      a fourth preset area provided at a center position of a left side or a right side of the screen corresponding to a page-turning operation of the application interface.

2. The method according to claim 1, wherein the control point is an area control that is semi-transparent and floats above the application interface, and the control point is moved on the screen based on a dragging operation of a finger.

3. The method according to claim 1, wherein the application interface operation corresponding to the each preset area comprises an operation for restoring the application interface operation control as the control point, and the application interface operation control is restored as the control point in response to a preset input of a user.

4. The method according to claim 1, wherein:
   a position where the control point is established is a position on the screen at which the preset gesture for generating the control point begins or ends; and
   after being generated or moved, the control point automatically snaps to a nearest preset area.

5. The method according to claim 1, wherein:
   the preset gesture includes a "U" curve drawn on the screen; and
   the opposite gesture includes the "U" curve reversely draw on the screen.

6. An apparatus for controlling an application interface by a gesture, comprising:
   a hardware processor configured to:
   obtain a preset gesture inputted into a screen for establishing a control point, and an operation gesture inputted into the screen targeted for the control point, wherein the control point is deleted via an opposite gesture of the preset gesture, the preset gesture includes a two-dimensional screen-input pattern that is drawn along one direction, and the opposite gesture of the preset gesture includes the two-dimensional screen-input pattern that is drawn along an opposite direction of the one direction;
   generate the control point according to the preset gesture, the control point being associated with a plurality of preset areas on the screen; and
   according to the operation gesture, generate an application interface corresponding to a preset area that the control point is located at, by transforming the control point into an application interface operation control corresponding to the preset area when the control point is located at or moved to the preset area;
   wherein each preset area of the plurality of preset areas respectively corresponds to an application interface operation, the plurality of preset areas and the corresponding application interface operations include at least the following:
      a first preset area provided at a top of the screen corresponding to a title-bar operation of the application interface,
      a second preset area provided at a bottom of the screen corresponding to a menu-bar operation of the application interface, a third preset area provided at a center position of the screen corresponding to an advanced-menu of the application interface, and a fourth preset area provided at a center position of a left side or a right side of the screen corresponding to a page-turning operation of the application interface.

7. The apparatus according to claim 6, wherein:

the control point is located at a position on the screen at which the preset gesture for generating the control point begins or ends;

the hardware processor is further configured to:

after the control point is generated or moved, cause the control point to automatically snap to a nearest preset area, and delete the current control point via another preset gesture or an opposite gesture of the preset gesture for establishing the control point.

8. The apparatus according to claim 6, wherein the control point is an area control that is semi-transparent and floats above the application interface, and the control point is moved on the screen based on a dragging operation of a finger.

9. The apparatus according to claim 6, wherein each preset area of the one or more preset areas respectively corresponds to an application interface operation or a group of application interface operations.

10. A touchscreen mobile terminal comprising:

an apparatus for controlling an application interface by a gesture, comprising:

a hardware processor configured to:

obtain a preset gesture inputted into a screen for establishing a control point, and an operation gesture inputted into the screen targeted for the control point, wherein the control point is deleted via an opposite gesture of the preset gesture, the preset gesture includes a two-dimensional screen-input pattern that is drawn along one direction, and the opposite gesture of the preset gesture includes the two-dimensional screen-input pattern that is drawn along an opposite direction of the one direction;

generate the control point according to the preset gesture, the control point being associated with a plurality of preset areas on the screen; and according to the operation gesture, generate an application interface corresponding to a preset area that the control point is located at, by transforming the control point into an application interface operation control corresponding to the preset area when the control point is located at or moved to the preset area;

wherein each preset area of the plurality of preset areas respectively corresponds to an application interface operation, the plurality of preset areas and the corresponding application interface operations include at least the following:

a first preset area provided at a top of the screen corresponding to a title-bar operation of the application interface, a second preset area provided at a bottom of the screen corresponding to a menu-bar operation of the application interface, a third preset area provided at a center position of the screen corresponding to an advanced-menu of the application interface, and a fourth preset area provided at a center position of a left side or a right side of the screen corresponding to a page-turning operation of the application interface.

11. The touchscreen mobile terminal according to claim 10, wherein:

the control point is located at a position on the screen at which the preset gesture for generating the control point begins or ends; and the hardware processor is further configured to:

after the control point is generated or moved, cause the control point to automatically snap to a nearest preset area, and delete the current control point via another preset gesture or an opposite gesture of the preset gesture for establishing the control point.

12. A computer storage medium having a program stored thereon, the program being used for executing a method for controlling an application interface by means of a gesture, the method comprising:

obtaining, by a terminal browser, a preset gesture that is inputted into a screen for generating a control point, wherein the control point is deleted via an opposite gesture of the preset gesture, the preset gesture includes a two-dimensional screen-input pattern that is drawn along one direction, and the opposite gesture of the preset gesture includes the two-dimensional screen-input pattern that is drawn along an opposite direction of the one direction;

generating the control point according to the preset gesture, the control point being associated with a plurality of preset areas on the screen; and obtaining, by the terminal browser, an operation gesture inputted into the screen targeted for the control point and, according to the operation gesture, generating an application interface corresponding to a preset area that the control point is located at, by transforming the control point into an application interface operation control corresponding to the preset area when the control point is located at or moved to the preset area;

wherein each preset area of the plurality of preset areas respectively corresponds to an application interface operation, the plurality of preset areas and the corresponding application interface operations include at least the following:

a first preset area provided at a top of the screen corresponding to a title-bar operation of the application interface, a second preset area provided at a bottom of the screen corresponding to a menu-bar operation of the application interface, a third preset area provided at a center position of the screen corresponding to an advanced-menu of the application interface, and a fourth preset area provided at a center position of a left side or a right side of the screen corresponding to a page-turning operation of the application interface.

13. The computer storage medium according to claim 12, wherein the control point is an area control that is semi-transparent and floats above the application interface, and the control point is moved on the screen based on a dragging operation of a finger.

14. The computer storage medium according to claim 12, wherein the application interface operation corresponding to the each preset area comprises an operation for restoring the application interface operation control as the control point, and the application interface operation control is restored as the control point in response to a preset input of a user.

15. The computer storage medium according to claim 12, wherein:
   a position where the control point is established is a position on the screen at which the preset gesture for generating the control point begins or ends; and
   after being generated or moved, the control point automatically snaps to a nearest preset area.

* * * * *